United States Patent Office 3,810,871
Patented May 14, 1974

3,810,871
POLYURETHANE COATING COMPOSITION SUITABLE FOR USE IN LOW TEMPERATURE ENVIRONMENTS
Alfred E. Borchert, Cherry Hill, N.J., Frank M. Goff, Springfield, Pa., and Jerry Miron, Livingston, N.J., assignors to Atlantic Richfield Company, New York, N.Y.
No Drawing. Filed Nov. 3, 1972, Ser. No. 303,432
Int. Cl. C08g 22/14
U.S. Cl. 260—47 CB
15 Claims

ABSTRACT OF THE DISCLOSURE

A polyurethane coating composition suitable for coating metals exposed to low temperature environments having high adhesion, flexibility, impact strength, abrasion resistance, tensile strength and tear resistance, together with corrosion prevention properties comprising the reaction product of a polyaryl polyisocyanate with a mixture of polyhydroxyl polydiene, allyl ethers of methylol-substituted phenols and N,N-di(hydroxyisopropyl)aniline having incorporated therein a suspending agent for the allyl ethers of the methylol-substituted phenols. The preferred suspending agent is carbon black since it also acts as a reinforcing agent.

BACKGROUND OF THE INVENTION

This invention relates to polymeric coating compositions in particular elastomeric polyurethane coatings suitable for coating metals exposed to low temperature environments.

In recent years the search for oil throughout the world has centered in many areas wherein exceedingly low temperatures are encountered, for example on the North Slope of Alaska and similar areas. Any activity in such areas associated with exploration, drilling or laying of pipelines for transporting petroleum products such as crude oil or gas requires that the exposed metal surfaces be protected. During the short summer months ambient temperatures frequently reach 70° F. or more, while in the winter months temperatures as low as —70° F. are not infrequent. The problems encountered in protecting properly a pipeline, for example, exposed to such environmental conditions, are exceedingly difficult to solve. Thus, for example, with pipelines it is necessary to have a coating which can withstand handling, installation, and in-service performance. Accordingly, it is necessary to have a coating with high impact resistance and flexibility so that the coating is not damaged when the pipe is handled or lowered into position, whether above-grade or below-grade. In addition the coating must have high tear and abrasion resistance as well as tensile strength in order to withstand back filling operations. Likewise the coating should have excellent adhesion to prevent disbonding during use and finally, but not of the least importance, the coating should provide high corrosion resistance. Ordinary coatings are known which will meet these requirements at ordinary ambient temperatures encountered in the temperate zones of the world, but in the Arctic and sub-Arctic zones where exceedingly low temperatures are encountered in the winter months, it is necessary that these coatings retain the aforementioned properties at the low temperatures. The coatings of this invention meet all of these requirements.

In U.S. Pat. 3,674,743, there is described self-curing solid elastomers made by the reaction of a polyisocyanate with a polyhydroxyl polydiene, the polyhydroxyl polydienes are also particularly described in U.S. Pat. 3,673,-168, and are available commercially under the trademark "Poly B-D". These elastomeric compounds of 3,674,743, have distinguishing properties when compared with polyurethanes made from polyether or polyester polyols. Among these distinguishing properties are improvements in barrier properties and in enhanced low temperature properties such as brittle points in the range of —80° C. and below. These polyurethanes also have the ability to be highly extended to make the polyurethanes suitable for elastomer, caulking, sealant, adhesive and other applications.

It has been found, however that the application of polyurethanes based on these polyhydroxyl polydienes as a protective coating for pipelines is severely limited because of their poor impact resistance, poor adhesion, low tear strength and abrasion resistance among other properties. Consequently, it was necessary to modify these polyurethanes by the use of other polyols which would enhance the properties in which the polyurethanes based on the polyhydroxyl polydienes were deficient but which would not degrade the desirable properties. Polyols, for example which when reacted with polyisocyanates give polyurethanes having high abrasion resistance, were however too brittle or deficient in other properties to render them suitable for their use as coatings at low temperatures. It was completely unexpected therefore that, in accordance with this invention, a particular combination of hydroxy compounds could be reacted with a polyaryl polyisocyanate, all to be described hereinafter, to produce a composition which fulfills all of the requirements for the protection and coating of metals subjected to extremely low temperature environmental conditions.

SUMMARY OF THE INVENTION

In accordance with the instant invention a polyaryl polyisocyanate containing at least two isocyanate (—NCO) groups per molecule is reacted with a mixture of polyhydroxyl polydiene, allyl ethers of methylol-substituted phenols, and N,N-di(hydroxyisopropyl)aniline in the presence of a catalyst such as a tin containing catalyst and in the presence of a suspending agent for the allyl ethers such as carbon black, titanium dioxide, antimony oxide or the like. The composition is applied to clean metal surfaces either by brushing, rolling or spraying techniques and after being allowed to cure at temperatures ranging from about 100° F. to about 260° F. the composition develops the desired coating properties. Since the hydroxy compounds are generally highly viscous it is preferred that they be dissolved in a solvent such as toluene along with the catalyst in order to provide suitable contact with the polyaryl polyisocyanate. During reaction the toluene is flashed-off leaving the polyurethane product in the form of a coating which is allowed to cure in contact with the metal surface thus providing the desired finished coating with the properties enumerated hereinbefore.

It is an object of this invention therefore to provide a polyurethane coating composition suitable for coating metals exposed to low temperature environments.

It is another object of this invention to provide a polyurethane coating composition which exhibits high adhesion, flexibiilty, impact strength, abrasion resistance, tensile strength and tear resistance together with corrosion prevention properties on metals exposed to extremely low temperature environments.

It is another object of this invention to provide a polyurethane coating composition produced by reacting a polyaryl polyisocyanate with a mixture of hydroxy-containing compounds.

It is another object of this invention to provide a method for the production of polyurethane coating composition suitable for use in low temperature environments by reacting a polyaryl polyisocyanate with a mixture of polyhydroxyl polydiene, allyl ethers of methylol-substituted phenols and N,N-di(hydroxyisopropyl)aniline in the presence of a tin catalyst utilizing a suspending agent for the allyl ethers of methylol-substituted phenols.

It is an additional object of this invention to provide a method for producing a mixture of polyhydroxyl polydiene, allyl ethers of methylol-substituted phenols and N,N-di(hydroxyisopropyl)aniline suitable for reaction with a polyaryl polyisocyanate by employing a suspending agent for allyl ethers in said mixture.

It is another object of this invention to employ carbon black as the suspending agent for the allyl ethers in the mixture of hydroxy compounds which agent likewise functions as a reinforcing agent.

Other objects of this invention will be apparent from the detailed description which follows and from the claims.

DETAILED DESCRIPTION OF THE INVENTION

The polyaryl polyisocyanate preferred for use in this invention is one having at least two isocyanate (—NCO) functional groups per molecule, such compounds are available commercially, a particularly suitable material being sold under the tradename "PAPI," a polymethylene polyphenylisocyanate having the general formula:

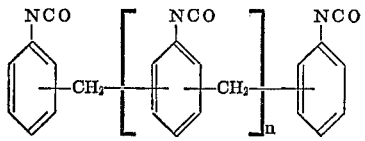

wherein $n$ is 0 or an integer such that the composition is approximately a trifunctional polyisocyanate.

Similar materials, such as 4,4'-diphenylmethane diisocyanate, generally referred to as "MDI," also are suitable but are less preferred than the materials having a somewhat higher isocyanate functionality.

The polyaryl polyisocyanate component for purposes of this description will hereinafter be referred to as component A. The B component which is reacted with the component A consists of as hereinbefore stated, a mixture of polyhydroxy compounds, preferably in a solvent such as toluene, together with a suspending and reinforcing agent, preferably carbon black and also a tin catalyst such as dibutyltin dilaurate.

The primary hydroxyl portion of component B consists of the aforementioned polyhydroxyl polydienes sold under the tradename, "Poly B-D." These are described as polyhydroxyl polymers having at least 2.1 predominantly primary, terminal, allylic hydroxyl groups per molecule, the polymer being made from 1,3-butadiene and 0 to 75 percent of alpha monoolefin.

The polyhydroxyl polymer has a Brookfield viscosity at 30° C. of about 5 to 20,000 poises and a number average molecular weight of about 400 to 25,000. The polyhydroxyl polymer can have about 40 to 70 percent trans-1,4-unsaturation, 10 to 30 percent cis-1,4-unsaturation and 10 to 30 percent, 1,2-unsaturation. A typical polyhydroxyl polymer might contain 60 percent trans-, 20 percent cis-, and 20 percent 1,2-unsaturation. In general these polymers can be described as having a hydroxyl terminated polybutadiene type of backbone structure. Their properties and methods of preparation are completely described in the aforementioned patents. The second hydroxyl portion of component B consists of the allyl ethers of methylol-substituted phenols. These are also available commercially and are sold under the trade name "Methylon." The specific material preferred for this invention is "Methylon 75108," this material is characterized by the general formula:

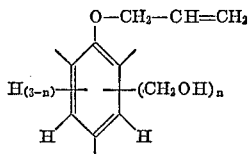

where $n=1$, 2 or 3 and may be described as a mixture of allyl ethers of mono-, di- and tri-methylol phenol, generally with an average of two methylol groups.

The third hydroxyl portion of component B is the compound N,N-di(hydroxyisopropyl)aniline which is also available commercially and sold under the trade name of "Isonol C-100." Its formula is:

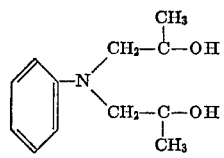

Since the polyhydroxy polydiene is generally the major hydroxyl composition of component B its weight ratio to each of the other portions of component B is used to specify the composition of component B.

The weight ratio of the polyhydroxyl polydiene to the allylic ethers of the methylol-substituted phenols may range from 90:10 to 10:90 with a preferred ratio being in the range of from 80:20 to 60:40 and with a particularly preferred ratio being about 70:30.

The weight ratio of the polyhydroxyl polydiene to the N,N-di(hydroxyisopropyl)aniline can range from 96:4 to 84:16 with a preferred ratio of 95:5 to 90:10 and a particularly preferred ratio of 93:7.

Since all of the foregoing materials are highly viscous liquids it is necessary that a solvent be employed in order that they can be handled conveniently for reaction with component A. Accordingly, from about 30 to 60 weight percent of component B is a solvent preferably a hydrocarbon solvent, and most preferably an aromatic hydrocarbon solvent, in particular benzene, toluene or the xylenes, with toluene being the most preferred of these. In general from 40 to 45 weight percent of the weighted component B can be the preferred solvent toluene with 41 to 43 weight percent being a most desirable range. Since the solvent is to be subsequently removed by flashing, it is preferred to employ only an amount sufficient to provide the desired viscosity to component B and avoid using an excess which merely adds to the expense and requires additional time for removal.

It has been found however, the second hydroxyl portion of component B is not sufficiently soluble to remain in solution in the non-reacting solvent. It was also found to be incompatible with the polyhydroxyl polydiene. Consequently, it has been found necessary to employ a dispersing agent for the allylic ethers of the methylol-substituted phenols. Since this material is an exceedingly important part of component B and cannot be omitted therefrom, it is necessary to have a means of dispersing this material in the component B mixture. It is an important part of this invention that it has been found that certain specific dispersing agents including carbon black, titanium dioxide and calcium carbonate could be employed. Moreover, it was also found that it was necessary to employ a suspending agent having a maximum average particle size not exceeding about 10 microns and an ultimate average particle size not exceeding about 50 millicrons. If larger sized particles were employed a nonstable dispersant was obtained. It is an additional important feature of this invention, however, that it was found that carbon black not only provided the desired dispersion properties for the allylic ethers but also provided reinforcement for the desired beneficial features of the final composition such as impact strength, abrasion resistance, tensile strength and tear resistance. Accordingly, carbon black is the preferred suspending agent since it is also a reinforcing agent.

There are a large number of carbon blacks available commercially both of the channel type and furnace type. It has been found that the particular type of carbon black is not extremely critical provided it has a particle size of less than 10 microns and an ultimate particle size of less than 50 millimicrons. A particular carbon black employed herein is sold under the trade name "Raven-30", and has an ultimate particle diameter in millimicrons of 27 (arithmetic mean). The weight ratio of the polyhydroxy polydiene to carbon black can range from 90:10 to 60:40 with a preferred range of from 80:20 to 65:35 and a particularly preferred ratio of 70:30. This ratio is not only suitable for suspending the allylic ethers in component B but it is also preferred for providing the necessary reinforcement. Similar ratios of the other suspending agents also can be used but it is to be understood, however, that these suspending agents do not provide the additional advantage of reinforcing the desirable properties of the finished composition.

Finally, it is generally preferred to incorporate the tin catalyst in the component B. Any of the usual tin-containing catalysts suitable for catalyzing the reaction between an isocyanate and an alcohol can be employed, for example dibutyltin dilaurate or stannous octoate, the former being particularly suitable and commercially available.

The component B in final form is a stable dispersion with a Brookfield viscosity above about 7000 centipoises (cps.) at 70° F. In order to maintain this stable dispersion which is critical to the satisfactory application of the coating, the particle size of the carbon black must be below the aforementioned size of about 10 microns.

One method of providing a stable dispersion is to mill the carbon black and polyhydroxy polydiene on a three roll mill with minimum clearance to obtain a mastic-like material with a grind number on a Hegman gauge of greater than 7. The numbers on the Hegman gauge are an arbitrary scale such that a number slightly greater than 7, i.e. about 7.2, corresponds to a particle size of less than 10 microns. Alternatively, carbon black can be ball milled in the toluene and if it is to be stored, an inert suspending agent is used to keep the carbon black in suspension. If the toluene-carbon black mixture is to be employed immediately the suspending agent is unnecessary.

Although the carbon black as produced has an exceedingly fine particle size these particles tend to agglomerate and hence in any method of preparation in order to obtain the desired dispersion it is necessary to mill the carbon black into one or more of the components in such a manner that it is reduced in size to less than 10 microns, such that it will function as a suspending agent for the allylic ether component and also function to reinforce the properties of the finished product. Irrespective of the method, therefore, of introducing the carbon black whether into the polyhydroxy polydiene or into the toluene the remaining constituents are combined by adding them slowly using relatively low shear agitation in which the temperature is kept below about 110° F. In general the hydroxyl components are added to the toluene and the catalyst such as dibutyltin dilaurate is added last.

After the component B has been prepared it is ready to be admixed with the appropriate proportion by weight of the component A in order to maintain a predetermined isocyanate functionality to hydroxyl functionality ratio, generally referred to as the NCO/OH ratio. Such ratio is critical to this invention and, therefore, all other materials capable of reacting with component A, the polymeric isocyanate, such as water, should be avoided as a contaminate. Ratios (NCO to OH) can range between 1:1 and about 2:1 with a preferred ratio between 1 and 1.5 and a most preferred ratio of 1.1:1. The appropriate proportions by weight of component A and B to give the desired NCO/OH ratio are mixed thoroughly. In order to control the pot life of such mixture (from about 5 to 35 minutes), the temperature can be varied, e.g. from 70° F. to 200° F., or the amount of catalyst can be varied from 0.01 to 1.0 wt. percent of component B. The higher temperatures of mixing or the higher the catalyst level the shorter the pot life all of this being well known urethane production technology.

The thoroughly mixed components are applied to the metal surface which has been prepared by sand blasting or shot blasting to a bright metal finish (NACE rating of 1). The so-called anchor pattern on such a surface is usually on the order of 1 to 1½ mils, although 2-6 mil anchor patterns have been used to further improve adhesion. The application can be made either with a brush or roller at ambient temperatures (70° F.) and the thickness of the coating can be adjusted in a single application or more preferably in multiple applications where the successive coatings are applied to essentially tack-free surfaces, in other words, the coatings are allowed to cure partially so that they are in a tack-free condition, but it is preferred that they do not cure completely before the next coating is applied. Thicknesses in the range of from about 2 to about 25 mils have been evaluated and have been found to be satisfactory.

After application of the coatings the system is heated to cure the coating, i.e. to develop the maximum values of the mechanical properties. Temperatures in the range of from 100° F. to about 260° F. can be used for times ranging from about 0.5 hour to about 15 hours.

Alternatively, the appropriate proportions by weight of components A and B are mixed in the dispensing head of suitable spray equipment and are applied heated (e.g. 100° F. to 200° F.) on to the metal surface prepared as described. Commercially, in coating pipelines for example, spray techniques would probably prove to be the most economically feasible method. Commercial spraying machines are available which will automatically proportion the components in the predetermined desired ratio and apply them at the desired temperatures and also in the desired amounts to provide an evenly coated surface. Again it is possible to apply either a single coating or build up a coating by a series of passes. Curing is accomplished in the same manner as for the brush or roller application.

While the coating described heretofore was made by a one shot technique in which components are reacted in a single step, it is understood that a prepolymer technique can also be used. The polyhydroxy polydiene or the allyl ethers of methylol-substituted phenols can be converted to a prepolymer by reaction with excess polyaryl polyisocyanate in a first step and cured by further reaction with hydroxylated components in a later step. A combination of economics, handling ease and performance considerations make the one shot technique a preferred procedure.

The coating of the instant invention was designed for the protection of metal substrates but it is understood that it is not limited to this application and it has been successfully used as a coating for cement, polyurethane foam, wood and plastics.

The following examples are provided to illustrate the invention in greater detail. For purposes of comparison a master batch of the polyhydroxyl polydiene, grade "Poly B-D 45HT" having about 2.3 predominantly primary, terminal allylic hydroxyl groups per molecule and a number average molecular weight of about 2500 and the above described "Raven-30" carbon black in a weight ratio of 70:30 was made on a three roll mill (2 passes at minimum mill clearance) to obtain the mastic-type product. This was used in formulating component B in each of the examples which follows. In addition the allylic ethers of the methylol-substituted phenols were those described above having the trade name, "Methylon 75108." The N,N-di(hydroxyisopropyl)aniline was that sold under the trade name "Isonol C-100," also described above. In each example the catalyst was dibutyltin dilaurate. The polyaryl polyisocyanate, component A, in each example was the material described above under the tradename "PAPI." The toluene employed was paint grade quality, high purity, substantially water-free material. Accordingly, in the examples which follow, the purposes of brevity, the trade names described above are employed where convenient. The amount of each material is given in grams, except the catalyst which is in weight percent based on the total weight of component B. Also in the examples a number of standard and specialty tests were employed. These are enumerated in Table I.

EXAMPLE I

The following were mixed at 70° F. under low shear:

Component B:                                           Run 1
  Poly B-D 45HT/carbon black (70/30 mixture) _____g__ 17
  Toluene _____g__ 13
  Isonol C-100 _____g__ 1
  Methylon 75108 (wt. ratio Poly B-D/Methylon=66.5/33.5) _____g__ 6
  Dibutyltin dilaurate _____percent__ 0.04

The resulting, highly viscous dispersion, component B, was then mixed with 11.6 g. of PAPI (NCO/OH ratio =1.09) and the product was applied to bonderized treated flat steel Q panels. After curing to essentially a tack-free condition the panel was post-cured at 160° F. for 30 mins. The resulting coating had a pencil hardness of 7B, >160 in-lb. of forward impact resistance at −30° C. and >180° flexibility at −30° C. (¼ inch mandrel bend).

EXAMPLE II

The following were mixed at 70° F. under low shear to illustrate the effect of varying the content of Methylon 75108:

| Component B | Run 2 | Run 3 | Run 4 |
|---|---|---|---|
| Poly B-D 45HT/carbon black 70/30 mixture (g.) | 17 | 17 | 17 |
| Toluene (g.) | 13 | 13 | 13 |
| Isonol C-100 (g.) | 1 | 1 | 1 |
| Methylon 75109 (g.) | 10 | 8 | 6 |
| Dibutyltin dilaurate (percent) | 0.04 | 0.04 | 0.04 |

The resulting, highly viscous dispersions were then mixed with appropriate amounts of PAPI and the product was applied to bonderized treated flat steel Q panels. After curing to essentially a tack-free condition the panels were post-cured at 160° F. for 30 mins.

|  | Run 2 | Run 3 | Run 4 |
|---|---|---|---|
| PAPI (g.) | 17.7 | 14.6 | 11.6 |
| NCO/OH | 1.11 | 1.10 | 1.09 |

| Results | Run 2 | Run 3 | Run 4 |
|---|---|---|---|
| Pencil hardness at room temperature | 6B | 6B | 7B |
| Flexibility at −30° C. (¼″ mandrel) | >180 | >180 | >180 |
| Forward impact resistance at −30° C. (in-lb.) | 120 | 120 | >160 |
| Reverse impact resistance at −30° C. (in-lb.) | 20 | 20 | >160 |
| Tear strength (g./mil) | 9 | 7 | 23 |
| Adhesion | Good | Good | Fair |
| Ratio Poly B-D/Methylon | 54.3/45.7 | 59.8/40.2 | 66.5/33.5 |

EXAMPLE III

The following were mixed at 70° F. under low shear. Methylon 75108, toluene and Poly B-D 45HT were varied:

| Component B | Run 5 | Run 6 | Run 7 | Run 8 |
|---|---|---|---|---|
| Poly B-D 45HT/carbon black 70/30 mixture (g.) | 33 | 57 | 79 | 95 |
| Toluene (g.) | 24 | 42 | 58 | 69 |
| Isonol C-100 (g.) | 1 | 1 | 1 | 1 |
| Methylon 75108 (g.) | 5 | 3 | 2 | 1 |
| Dibutyltin dilaurate (percent) | 0.4 | 0.4 | 0.4 | 0.4 |

The resulting, highly viscous dispersions were then mixed with PAPI and the products were applied to bonderized treated flat steel Q panels. After curing to essentially a tack-free condition the panels were post-cured at 160° F. for 30 mins.

|  | Run 5 | Run 6 | Run 7 | Run 8 |
|---|---|---|---|---|
| PAPI (g.) | 11.6 | 11.6 | 11.6 | 11.6 |
| NCO/OH | 1.09 | 11.6 | 1.11 | 1.11 |

| Results | Run 5 | Run 6 | Run 7 | Run 8 |
|---|---|---|---|---|
| Pencil hardness at room temperature | 7B | 7B | 7B | 7B |
| Flexibility at −30° C. (¼″ mandrel) | 180 | 180 | 180 | 180 |
| Forward impact resistance at −30° C. (in.-lb.) | 160 | 160 | 160 | 160 |
| Tear strength (g./mil) | 23 | 9 | 6 | 8 |
| Adhesion | Poor | Poor | Poor | Poor |
| Ratio Poly B-D/Methylon | 82.2/17.8 | 93/7 | 96.5/3.5 | 98.5/1.5 |

EXAMPLE IV

The following were mixed at about 70° F. under low shear. These examples illustrate the effectiveness of the methylon component in improving adhesion, hardness, tear strength and solvent resistance.

| Component B | Run 9 | Run 10 |
|---|---|---|
| Poly B-D 45HT/carbon black 70/30 imxture (g.) | 17 | 17 |
| Toluene (g.) | 13 | 13 |
| Isonol C-100 (g.) | 1 | 1 |
| Methylon 75108 (g.) | 6 |  |
| Dibutyltin dilaurate (percent) | .04 | .04 |

The resulting, highly viscous dispersions were then mixed with PAPI.

|  | Run 9 | Run 10 |
|---|---|---|
| PAPI (g.) | 11.6 | 2.8 |
| NCO/OH | 1.09 | 1.04 |

The products were brush applied to bonderized treated flat steel Q panels. After curing to essentially a tack-free condition the panels were post-cured at 160° F. for 30 mins.

| Results | Run 9 | Run 10 |
|---|---|---|
| Pencil hardness at room temperature | 7B | 6B |
| Tear strength (g./mil) | 23 | 14 |
| Cross hatch adhesion | 100/100 | 10/100 |
| Solvent resistance: |  |  |
| MEK (2 hrs. at R.T.) | Lifting | Lifting |
| Toluene (6 hrs. at R.T.) | *NE | Lifting |
| Xylene (6 hrs. at R.T.) | *NE | Lifting |
| Hexane (6 hrs. at R.T.) | *NE | *NE |
| Ratio Poly B-D/Methylon | 66.5/33.3 |  |

* Not effected.

EXAMPLE V

The following formulation was selected to evaluate the coating on both pipe specimens and flat steel plate according to the tests enumerated in Table I. The product was brush applied and after curing to essentially a tack-free condition the specimens were post-cured at 160° F. for 30 mins.

| | Weight percent | Lb./gal. | |
|---|---|---|---|
| Component B: | | | |
| Poly B-D 45HT | 28.96 | 2.28 | |
| Raven 30 carbon black | 12.51 | 0.98 | |
| Isonol C-100 | 2.44 | 0.19 | |
| Methylon 75108 | 14.62 | 1.15 | |
| Dibutyltin dilaurate | 0.05 | 0.004 | |
| Toluene | 41.42 | 3.26 | |
| Total | 100.00 | 68.7 | |
| Component A: | | | |
| PAPI | 100. | 10. | |
| NCO/OH | 1.10 | | |
| Weight B/weight A | | | 77.9/22.1 |
| Weight Poly B-D/carbon black | | | 69.8/30.2 |
| Weight Poly B-D/Methylon 75108 | | | 66.5/33.5 |
| Weight Poly B-D/Isonol C-100 | | | 92.2/7.8 |

TABLE I

| Number | Test and description | Months (days) | Status |
|---|---|---|---|
| 1 | −20° F. Bend: 2″ OD schedule 40 pipe, 18″ length sand blasted to NACE 1 rating—brush coated to 15-18 mil dry film build—cooled to −20° F. and bent using center point loading on a 12″ span with a ⅛″ radius bearing bar to a 15° angle from the original true line of the pipe. | | Passed. |
| 2 | −20° F. Impact: pipe specimen prepared and coated as above—cooled to −20° F. and a 2.3 lb., 2.5″ diameter, steel ball was dropped from a height of 3′ at 3 places. | | Do. |
| 3 | −20° F. Abrasion: pipe specimen prepared and coated as above—cooled to −20° F. and 25 lbs. of 1″ crushed stone aggregate slowly dropped from a height of 3′. | | Do. |
| 4 | Condensing humidity: steel Q panels were sand blasted to NACE 1 rating—brush coated 5 and 15 mil dry film build—exposed in Cleveland Condensing Humidity Cabinet for 500 hrs. at 120° F. condensing temperature. Specimens at 15° incline for water run off. (Q Panel Company Manufacturer). | (20.8) | Do. |
| 5 | Weatherometer: steel Q panels were prepared and coated as in 4, above—exposed in Weatherometer Cabinet for 500 hrs. (accelerated weathering, Federal test method. Standard 141-A, 6151, ASTM D-822 Atlas weatherometer Model XW, Atlas Electrical Devices Co.). | (20.8) | Passed (specimen chalked). |
| 6 | Immersion in aqueous base: pipe specimens were prepared and coated as in 1, above—they were immersed in an aqueous solution of pH 9 (NaOH) at 150° F. for 10 weeks and the pH was raised to 11 for an additional 8 weeks. | 4.5 | Passed. |
| 7 | Immersion in aqueous acid: pipe specimens were prepared and coated as in 1, above—they were immersed in an aqueous solution of pH 1 (HCl) at 150° F. for 12 weeks. | 3 | Do. |
| 8 | Freeze/thaw cycling: pipe specimens were prepared and coated as in 1, above—they were cycled through −70° F. and +70° F. at 1 cycle/week for 18 weeks. | 4.5 | Do. |
| 9 | Salt fog: steel Q panels were prepared and coated as in 4, above—they were exposed for 500 hrs. in Industrial Filter and Pump Salt Fog Cabinet, type 411 cabinet, size 3, Federal test method, Standard 141-A, 6061, ASTM B-117, 5% salt solution employed, panels at 15-30° from vertical. | (20.8) | Do. |
| 10 | Outside exposure: steel Q panels were prepared and coated as in 4, above, coating build 12-15 mils, they were set in a southern exposure at a 45° incline. | 3 | Passed (specimen chalked); |
| 11 | Salt crock: 2″ OD steel pipe, 22″ lengths, were sand blasted to NACE 1 rating with above 6 mil profile—an inorganic zinc primer was applied to about 1 mil build—the pipe coating was brush applied to a 15-18 mil build—the ends were sealed and a #14 copper wire was attached—five 116″ diam. holidays were drilled through the coating—specimens placed in a salt solution containing 3 wt. percent each of NACl, Na₂CO₃ and Na₂SO₄—a 3.0 v. potential was applied using Duriron anodes—amount of current flowing to each coupon was measured each week—physical inspection was made at end of test. | (30) | Satisfactory. |

In addition to the compositions shown in the foregoing examples, a large number of other compositions were employed in which both the individual components and the portions of components employed were varied. For example, since the Poly B-D has an average of 2.1 or more hydroxyl groups per molecule and the composition is a mixture of those having 2.0 hydroxyl groups with molecules having 3.0 or more since a partial hydroxyl group is, of course, impossible, the use of Poly B-D having exactly 2.0 hydroxyl groups per molecule is completely feasible. Similarly, other components were varied within the limits of the invention and were found to be successful.

Other runs were carried out with the individual polyols reacted with the polyisocyanate and in all cases these were found to be completely unsatisfactory, being either too soft, too brittle, lacking abrasion resistance, having insufficient tensile and tear properties, lacking adhesion or lacking corrosion prevention. Accordingly, from these runs it was determined that the combination set forth above is required.

Thus it will be seen from the foregoing examples that the coatings of this invention prepared in accordance with the methods of this invention meet all of the objectives of the invention, i.e. they provide protection to metals exposed to low temperature environments by having high adhesion, flexibility, impact strength, abrasion resistance, tensile strength and tear resistance, together with corrosion prevention properties. As stated hereinbefore the individual polyols when reacted with the polyisocyanates do not provide coatings having all these properties.

The reaction of the individual polyhydroxy compounds with polyisocyanates are known, but the totally unexpected discovery is that although these polyhydroxy components are incompatible with each other, i.e. they do not admix with each other under ordinary conditions, they can be admixed in accordance with this invention by use of a suspending agent of a particular particle size and thus can be reacted with a polyisocyanate to produce the polyurethane coating having the aforementioned desired properties. It would normally be expected that if incompatible polyhydroxy compounds were reacted with a polyisocyanate there would be produced a non-uniform mixture of polyurethanes, one part being flexible, for example, without abrasion resistance, another part having high abrasion resistance but being too brittle and another part having high tensile strength, for example, without the other desired properties. The surprising discovery not heretofore shown in the prior art is that these individual polyhydroxy compounds although incompatible with each other can be rendered into a stable suspension by the use of the method of this invention such that they can be reacted with a polyisocyanate to produce a homogeneous coating having all the broad range of desired properties.

The components of this invention in particular the Poly B-D have sufficient functionality to provide for cross-linking and cross-linking does occur, thus, although other cross-linking agents can be employed in the composition, they are unnecessary.

We claim:

1. A cured polyurethane coating composition characterized by having high adhesion, flexibility, impact strength, abrasion resistance, tensile strength, tear resistance and corrosion prevention properties which comprises the product obtained by reacting a polyaryl polyisocyanate with a mixture of polyhydroxy compounds comprising a polyhydroxyl polydiene having at least 2.0 predominantly primary, terminal, allylic hydroxyl groups per molecule with a polydiene type of backbone structure and a molecular weight in the range of about 400 to 25,000, a mixture of the allyl ethers of mono-, di- and tri-methylol phenols having an average of 2 methylol groups and N,N-di(hydroxyisopropyl)aniline, at a temperature of about 100 to 260° F. in the presence of a solvent; said mixture of polyhydroxy compounds having a weight ratio of the polyhydroxyl polydiene to the allyl ethers of the methylol-substituted phenols in the range of from 90:10 to 10:90, a weight ratio of the polyhydroxyl polydiene to the N,N-di(hydroxyisopropyl)aniline in the range of from 96:4 to 84:16 and a weight ratio of the polyhydroxy polydiene to the suspending agent for said allyl ethers in the range of from 90:10 to 60:40; said product being characterized by having a ratio of isocyanate groups to hydroxyl groups in the range of from 1:1 to 2:1; and said mixture of allyl ethers having been suspended in said mixture of polyhydroxyl compounds prior to reaction with said polyisocyanate by the use of a suspending agent having a particle size of less than 10 microns.

2. The composition according to claim 1, wherein said polyaryl polyisocyanate is a polymethylene polyphenylisocyanate of the general formula:

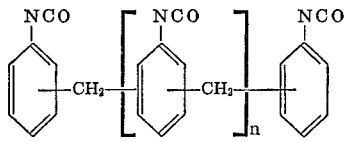

wherein $n$ is 0 or an integer such that the composition is approximately a trifunctional polyisocyanate.

3. The composition according to claim 1, wherein said polyaryl polyisocyanate is 4,4'-diphenylmethane diisocyanate.

4. The composition according to claim 1, wherein said polyhydroxy polydiene is further characterized by having about 2.3 prodominantly primary, terminal, allylic hydroxyl groups per molecule and a number average molecular weight of about 2500.

5. The composition according to claim 4, wherein said allyl ethers are characterized by having the formula:

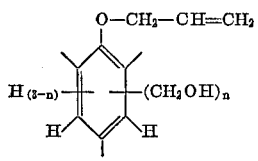

where $n=1$, 2 or 3, and said suspending agent being carbon black.

6. The composition according to claim 2, being further characterized in that said mixture of polyhydroxy compounds has a weight ratio of the polyhydroxyl polydiene to the allyl ethers of the methylol-substituted phenols in the range of from 80:20 to 60:40, a weight ratio of the polyhydroxyl polydiene to the N,N-di(hydroxyisopropyl) aniline in the range of from 95:5 to 90:10 and a weight raito of the polyhydroxyl polydiene to the suspending agent for said allyl ethers in the range of from 80:20 to 65:35, said polyhydroxyl polydiene being characterized by having about 2.3 predominantly primary, terminal, allylic hydroxy groups per molecule and a number average molecular weight of about 2500, said allyl ethers being further characterized by having the formula:

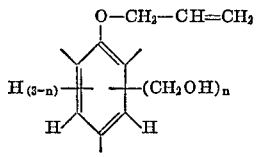

and said suspending agent is carbon black.

7. The composition according to claim 6, wherein said weight ratios of polyhydroxyl polydiene to said allyl ethers, said N,N-di(hydroxyisopropyl)aniline and said carbon black are, respectively, 70:30; 93:7 and 70:30 and said ratio of isocyanate groups to hydroxyl groups in the range of 1:1 to 1.5:1.

8. A method for producing a polyurethane coating composition suitable for coating metals exposed to low temperature environments and characterized by having high adhesion, flexibility, impact strength, abrasion resistance, tensile strength, tear resistance and corrosion prevention properties which comprises contacting polyaryl polyisocyanate with a mixture of polyhydroxy compounds comprising a polyhydroxyl polydiene having at least 2.0 predominantly primary, terminal, allylic hydroxyl groups per molecule with a polydiene backbone structure and a molecular weight of about 400 to 25,000, a mixture of the allyl ethers of mono-, di- and tri-methylol phenols having an average of 2 methylol groups and N,N-di(hydroxyisopropyl)aniline said allyl ethers being suspended in said mixture of polyhydroxy compounds by the use of a suspending agent having a particle size of less than 10 microns, said suspension of said polyhydroxy compounds being admixed with an aromatic hydrocarbon solvent with said solvent ranging from about 30 to 60 weight percent of the total weight of the admixture, said contacting of said polyisocyanate with said aromatic solvent polyhydroxy compound suspension being at a temperature of about 100° F. to 260° F. in the presence of a catalytic amount of a tin-containing catalyst, the amounts of said polyaryl polyisocyanate and said mixture of said polyhydroxy compounds being such that the ratio of isocyanate groups to hydroxyl groups is in the range of from 1:1 to 1:2, said mixture of polyhydroxy compounds having a weight ratio of the polyhydroxyl polydiene to the allyl ethers of the methylol-substituted phenols in the range of from 90:10 to10:90, a weight ratio of the polyhydroxyl polydiene to the N,N-di(hydroxyisopropyl) aniline in the range of from 96:4 to 84:16 and a weight ratio of the polyhydroxy polydiene to the suspending agent for said allyl ethers in the range of from 90:10 to 60:40.

9. The method according to claim 8, wherein said polyaryl polyisocyanate is a polymethylene polyphenylisocyanate of the general formula:

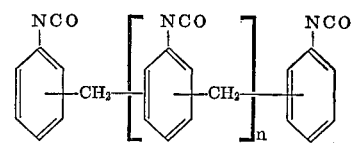

wherein $n$ is 0 or an integer such that the composition is approximately a trifunctional polyisocyanate.

10. The method according to claim 8, wherein said polyaryl polyisocyanate is 4,4'-diphenylmethane diisocyanate.

11. The method according to claim 8, wherein said polyhydroxy polydiene is further characterized by having about 2.3 predominantly primary, terminal, allylic hydroxyl groups per molecule and a number average molecular weight of about 2500.

12. The method according to claim 11, wherein said allyl ethers are characterized by having the formula:

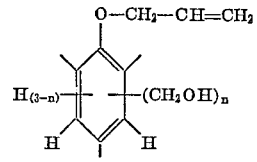

where $n=1$, 2 or 3, and said suspending agent being carbon black.

13. The method according to claim 9, being further characterized in that said mixture of polyhydroxy compounds has a weight ratio of the polyhydroxyl polydiene to the allyl ethers of the methylol-substituted phenols in the range of from 80:20 to 60:40, a weight ratio of the polyhydroxyl polydiene to the N,N-di(hydroxyisopropyl) aniline in the range of from 95:5 to 90:10 and a weight ratio of the polyhydroxy polydiene to the suspending agent for said allyl ethers in the range of from 80:20 to 65:35, said polyhydroxyl polydiene being characterized by having about 2.3 predominantly primary, terminal, allylic hydroxyl groups per molecule and a number average molecular weight of about 2500, said allyl ethers being further characterized by having the formula:

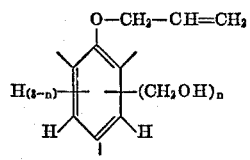

and said suspending agent is carbon black.

14. The method according to claim 13, wherein said weight ratios of polyhydroxyl polydiene to said allyl ethers, said N,N-(di(hydroxyisopropyl)aniline and said carbon black are, respectively, 70:30; 93:7 and 70:30 and said ratio of isocyanate groups to hydroxy groups is in the range of 1:1 to 1.5:1.

15. The method according to claim 8, wherein said contacting of said polyaryl polyisocyanate with said mixture of polyhydroxy compounds is at a temperature in the range of 70° F. to 200° F.

References Cited
UNITED STATES PATENTS

| | | |
|---|---|---|
| 3,516,954 | 6/1970 | Dusseldorf et al. 260—18 |
| 3,523,100 | 8/1970 | Stein et al. 260—47 |
| 3,594,352 | 7/1971 | Lloyd et al. 260—77.5 |
| 3,635,891 | 1/1972 | Lubowitz et al. 260—47 |

LESTER L. LEE, Primary Examiner

U.S. Cl. X.R.

117—132 B, 138.8 D, 148, 161 KP; 260—37 N, 77.5 AP, 77.5 AM

UNITED STATES PATENT OFFICE
CERTIFICATE OF CORRECTION

Patent No. 3,810,871　　　　　　　　　Dated May 14, 1974

Inventor(s) Alfred E. Borchert, Frank M. Goff, Jerry Miron

It is certified that error appears in the above-identified patent and that said Letters Patent are hereby corrected as shown below:

Claim 6, line 8, "raito" should read --ratio--.

Claim 11, line 1, "8" should read --9--.

Signed and sealed this 1st day of October 1974.

(SEAL)
Attest:

McCOY M. GIBSON JR.　　　　　　　　C. MARSHALL DANN
Attesting Officer　　　　　　　　　　Commissioner of Patents